March 27, 1956     E. B. MILLER     2,739,670
CYCLIC ADSORPTION PROCESS
Filed Jan. 26, 1954     8 Sheets-Sheet 1

FIG. I.

INVENTOR
ERNEST B. MILLER

BY Adams + Bush
ATTORNEYS

March 27, 1956 E. B. MILLER 2,739,670
CYCLIC ADSORPTION PROCESS
Filed Jan. 26, 1954 8 Sheets-Sheet 2

INVENTOR
ERNEST B. MILLER
BY Adams + Brush
ATTORNEYS

March 27, 1956  E. B. MILLER  2,739,670
CYCLIC ADSORPTION PROCESS
Filed Jan. 26, 1954  8 Sheets-Sheet 3

INVENTOR
ERNEST B. MILLER

BY *Adams + Bush*

ATTORNEYS

March 27, 1956  E. B. MILLER  2,739,670
CYCLIC ADSORPTION PROCESS

Filed Jan. 26, 1954  8 Sheets-Sheet 5

INVENTOR
ERNEST B. MILLER
BY Adams + Bush
ATTORNEYS

March 27, 1956

E. B. MILLER 2,739,670

CYCLIC ADSORPTION PROCESS

Filed Jan. 26, 1954

INVENTOR
ERNEST B. MILLER

BY Adams + Bush

ATTORNEYS

March 27, 1956   E. B. MILLER   2,739,670
CYCLIC ADSORPTION PROCESS
Filed Jan. 26, 1954   8 Sheets-Sheet 7

INVENTOR
ERNEST B. MILLER
BY Adams + Bush
ATTORNEYS

March 27, 1956  E. B. MILLER  2,739,670
CYCLIC ADSORPTION PROCESS
Filed Jan. 26, 1954  8 Sheets-Sheet 8

INVENTOR
ERNEST B. MILLER
BY Adams + Bush
ATTORNEYS

United States Patent Office 2,739,670
Patented Mar. 27, 1956

2,739,670

CYCLIC ADSORPTION PROCESS

Ernest B. Miller, Houston, Tex., assignor to Jefferson Lake Sulphur Company, New Orleans, La., a corporation of New Jersey Application January 26, 1954, Serial No. 406,312

8 Claims. (Cl. 183—114.2)

This invention relates to gas dehydrating and has more particular reference to a novel and improved continuous method of removing moisture and condensable hydrocarbons from wet natural gas at the source, prior to the transmission thereof through pipe lines and recovering the condensable hydrocarbons.

One object of the present invention is to provide a novel and improved method of dehydrating wet gas using an adsorbent, such as silica gel, and recovering a large percentage of the condensable hydrocarbons, such as gasoline, etc.

Another object of the present invention is to provide a novel method of recovering condensable hydrocarbons from wet natural gas under high pressure, which is characterized by maintaining at least one bed of adsorbent material in each of a plurality of zones; continuously heating and recycling a captive activating gas through at least one of said zones to vaporize the moisture and condensable hydrocarbons contained in the adsorbent material therein and reactivate the adsorbent material; continuously directing the flow of the wet natural gas under high pressure through the remainder of said zones so that the contained moisture and condensable hydrocarbons will be adsorbed by the adsorbent material therein; periodically shifting the relative position of the particular adsorbent beds and the particular flow of fluids in each of said zones so that each zone becomes, in succession, a reactivation zone and an adsorption zone; continuously directing the flow of the recycling activation gas, after its passage through the reactivation zone, through a condensing and separating zone, and there condensing and recovering the water and condensable hydrocarbons and continuously directing the flow of the stripped gas back into the recycling path.

Another object of the present invention is to provide a novel method of dehydrating wet natural gas, under high pressure, as characterized above, wherein a continuous flow of a purging medium is directed through another one of said zones to purge the zone by removing all remaining activation gas and any remaining moisture and condensable hydrocarbons deposited on the adsorbent material, thereby purging the zone, and wherein the purging gas, after its passage through the purging zone, is directed into the flow of the gas being treated.

A further object of the present invention is to provide a novel method, as characterized above, wherein the gas being treated is dehydrated in two or more stages, and wherein the last dehydrating passage of the gas being treated is made through freshly activated adsorbent material.

Other objects and advantages of the invention will appear in the following specification when considered in connection with the accompanying drawings, wherein.

The present invention is drawn to a novel method of dehydrating wet natural gas under high pressure and removing the condensable hydrocarbons therefrom, and is an improvement over the method disclosed and claimed in my Patent No. 2,630,191, for Cyclic Adsorption Process.

Figure 1:
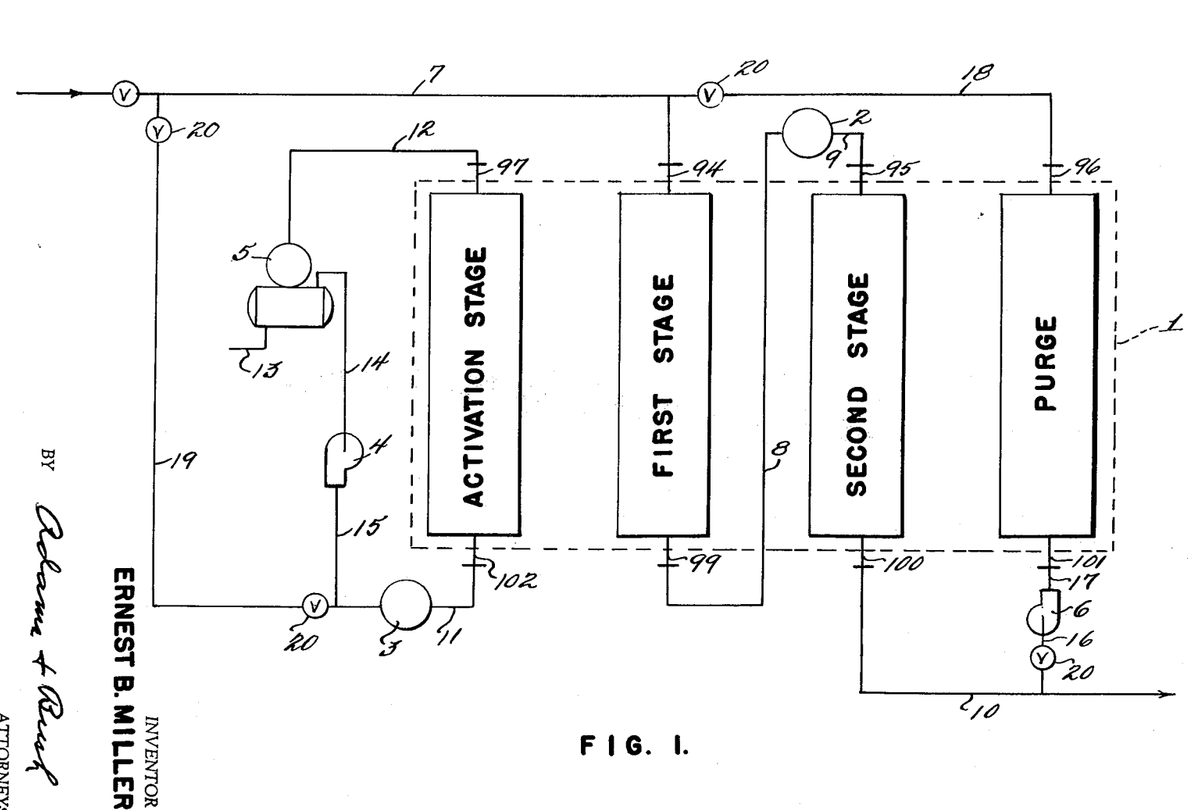
Fig. 1 is a schematic view showing the arrangement of one embodiment of apparatus employed in carrying out the method of the present invention and the flow of the various fluids therethrough.
Figure 2:
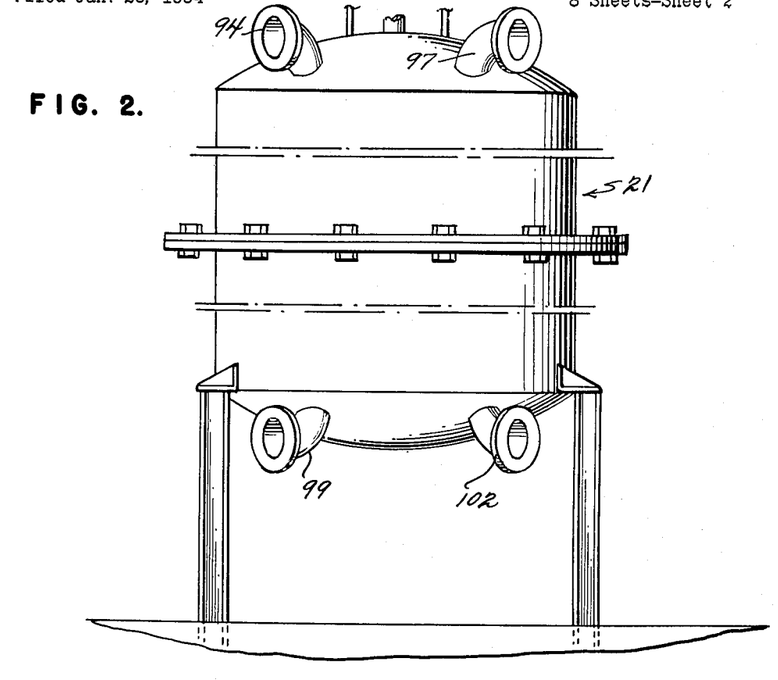
Fig. 2 is a side elevation showing the mounting and arrangement of the dehydrater, but omitting the dehydrater driving mechanism.
Figure 3:
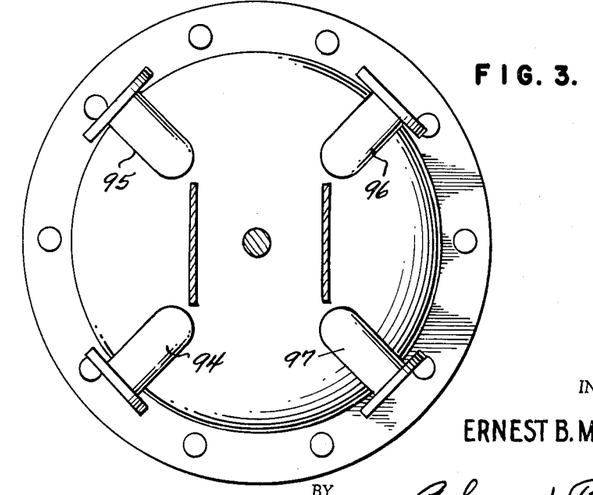
Fig. 3 is a plan view of the apparatus shown in Fig. 2.
Figure 4:
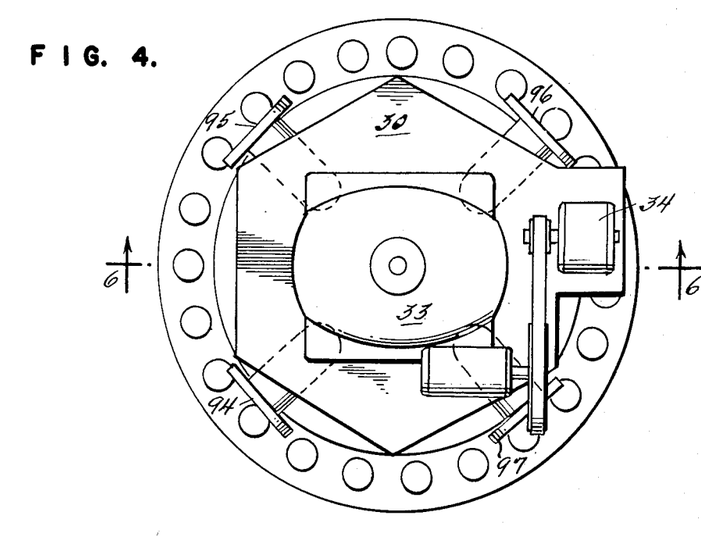
Fig. 4 is a plan view of the dehydrater.
Figure 5:
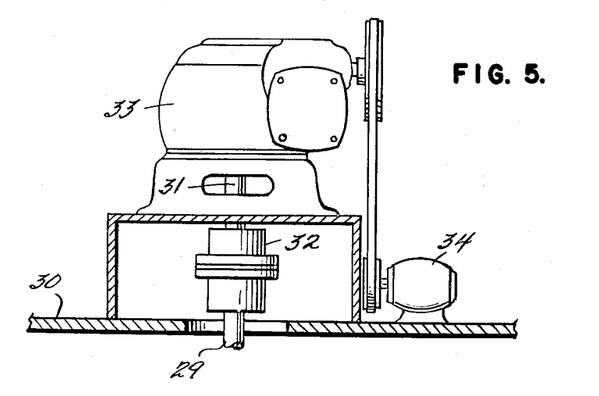
Fig. 5 is a side elevation, partly in section, of the dehydrater driving mechanism.

Referring now to the drawings, there is shown, in Fig. 1, one embodiment of apparatus and the arrangement thereof for carrying out the method of the present invention. The apparatus shown includes a four-stage dehydrater 1, the first and second stages of which are employed to dehydrate the wet gas, the third stage is employed to reactivate the adsorbent material within the dehydrater, and the fourth stage is employed to purge the adsorbent material in the dehydrater; an intercooler 2, employed to cool the wet gas between the first and second dehydration stages; a heater 3 employed to heat the gas used in the reactivating stage of the dehydrater; a low pressure fan or blower 4 for recirculating the activation gas through the reactivation stage of the dehydrater; a condenser separator 5 employed to condense the moisture and condensable hydrocarbons contained in the recirculating activation gas after it has passed through the reactivation stage of the dehydrater; and a fan or blower 6 for circulating the purging medium through the purging stage of the dehydrater.

The wet gas being treated is delivered, at high pressure, from the usual compressor or source of supply (not shown), to the first stage of the dehydrater by means of a pipe line 7. After passing through the first stage of the dehydrater, during which passage some of the moisture and condensable hydrocarbons were removed, the now partially dried gas passes through a pipe line 8 into the intercooler 2. From the intercooler, the cooled, partially dry gas passes through a pipe line 9 into the second dehydration stage of the dehydrater, where it is completely stripped of its remaining moisture and condensable hydrocarbons. From the second dehydration stage of the dehydrater, the now dry gas passes into pipe line 10 for transmission to the points of use.

The captive activation gas is heated in the heater 3 to a temperature of from 300° F. to 600° F., depending upon the moisture content and type of hydrocarbons to be recovered, and from the heater passes through a pipe line 11 into the third or reactivation stage of the dehydrater. The heated gas passes upwardly through the third stage, vaporizing and stripping the accumulated moisture and hydrocarbons from the adsorbent. The heated gas and the vapors stripped from the adsorbent pass through a pipe line 12 to the condenser separator 5, where the moisture and condensable hydrocarbons are condensed and separated. The water and hydrocarbons are drained from the bottom of the separator by means of a suitable line 13.

From the condenser separator the now stripped gas passes through a pipe line 14 to the fan or blower 4 and is recirculated by the blower through a pipe line 15 and the heater 3 back through the activation stage of the dehydrater. This circulation process is continuous.

The captive stream of gas in the activation system is circulated by means of the blower 4, through the heater 3, the activation stage of the dehydrater, and the condenser separator 5. The composition of this stream will build up gradually in terms of condensable vapors, composed chiefly of hydrocarbons, until the dew point of the captive gas stream reaches condenser temperature, and will thereafter yield as liquids all of the condensable vapors desorbed or stripped from the adsorbent material in the reactivation stage of the dehydrater.

The gas used as the purging medium may be taken from the pipe line 10 through pipe line 16, passes through blower 6 and then through pipe line 17, and passes upwardly through the fourth stage or purging stage of the dehydrater. As the purging gas passes through the purging stage it purges the adsorbent material therein by removing all remaining activating gas and any remaining moisture and condensable hydrocarbons deposited on the adsorbent material. From the purging stage the purging gas passes through pipe line 18 into the flow of the gas being treated, preferably before its entry into the first dehydration stage of the dehydrater.

The pipe lines 16 and 18 are provided with suitable cut off valves to permit the apparatus to be operated with the purging stage cut out.

While it is not necessary to provide outside gas for use as the captive activation gas, in order to speed up initial operation of the apparatus it may be desirable to do so. Accordingly, gas may be diverted from supply gas pipe line 7 through a valved pipe line 19 to the pipe line 15 for initial operation. The pipe lines 16, 18 and 19 are provided with suitable cut off valves 20.

Figure 6:
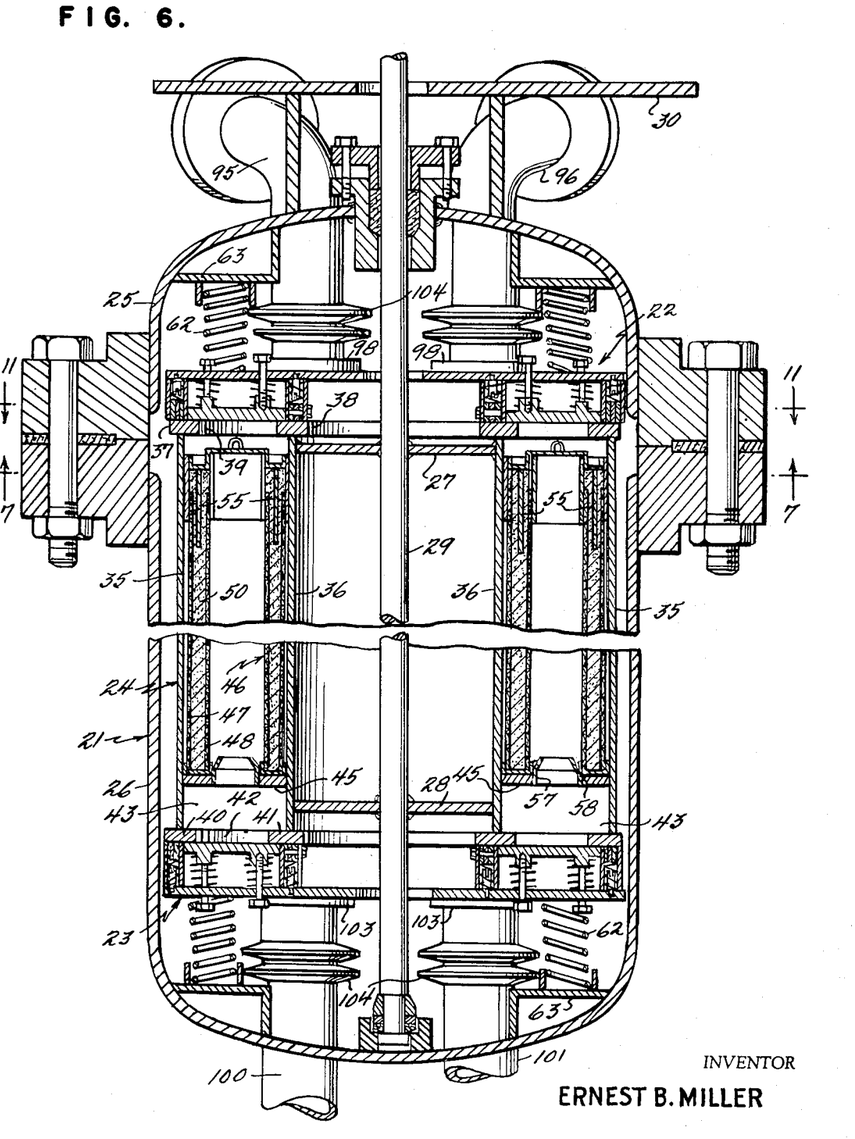
Fig. 6 is a vertical sectional view of the dehydrater, taken on the line 6—6 of Fig. 4, but omitting the driving mechanism.

While any suitable type of dehydrater may be employed to practice the method of the present invention, the dehydrater illustrated is generally similar to the converter shown in my Patent No. 2,507,538, and, as shown in Figs. 2 to 14, inclusive, comprises a pressure vessel 21; upper and lower annular manifolds 22, 23, fixedly mounted within the vessel; a compartmentized annular drum 24 rotatably mounted within the pressure vessel between and in communication with the manifolds; and suitable driving mechanism for rotating the annular drum (see Figs. 1 and 6).

The pressure vessel 21 is preferably formed in two parts, an upper flanged shell or cap 25 and a lower flanged shell 26 suitably secured together, as by bolting, to form a gas-tight joint.

The annular drum 24 is fixedly attached, as by means of plates 27, 28, to a central vertical shaft 29 suitably journaled in bearings carried by the upper and lower shell members 25, 26. The mechanism for rotating the annular drum is supported on a platform 30 mounted on the upper shell 25 and includes a shaft 31 connected to the upper end of the shaft 29 by a coupling 32. The shaft 31 is driven by suitable reduction gearing mounted in a housing 33, the reduction gearing being belt-driven by a motor 34.

The rotatable annular drum 24 is best shown in Fig. 6, and comprises two spaced concentric cylinders 35, 36 which form the side walls; two spaced annular plates 37, 38, each secured to the top of the cylinders 35, 36, respectively, form the top of the drum, the space between the annular plates 37, 38 forming an annular opening 39 in the top of the drum; two spaced concentric annular plates 40, 41, each secured to the bottom of the cylinders 35, 36, respectively, form the bottom of the drum, the space between the annular plates 40, 41 forming an annular opening 42 in the bottom of the drum.

Figure 7:
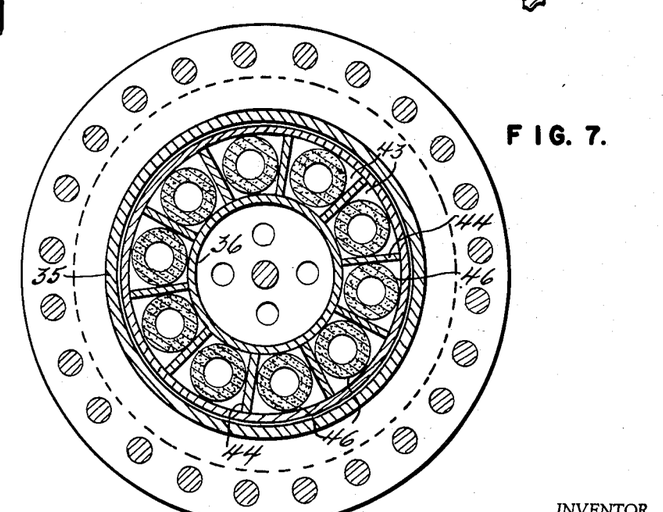
Fig. 7 is a horizontal sectional view of the dehydrater, taken on the line 7—7 of Fig. 6, but drawn to a smaller scale.

The rotatable annular drum is divided into a plurality of compartments 43 by radial partitions or diaphragms 44 (see Fig. 7). In each of the radial compartments 43, near the bottom thereof, there is provided a plate 45 attached to the walls of the compartment, as by welding, to form a gas-tight joint. Each plate 45 forms a support for one or more elongated annular tubular adsorbent containers 46. In the particular embodiment shown, only one such container is shown mounted in each compartment.

Figure 13:
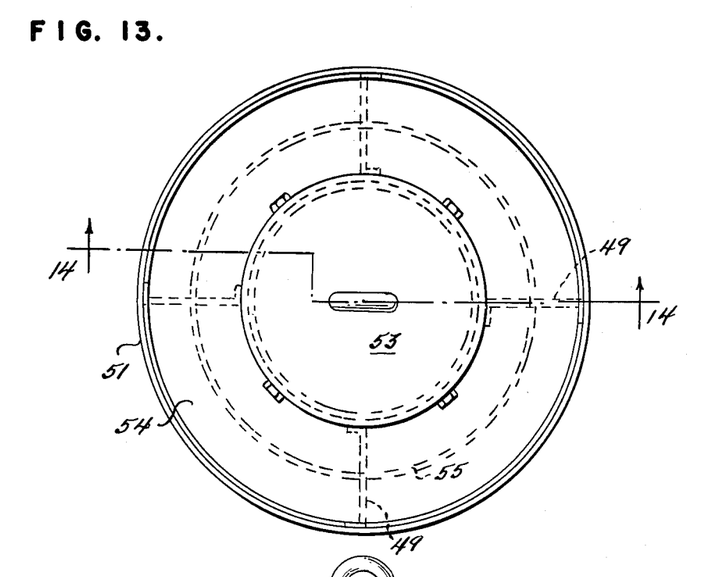
Fig. 13 is a plan view of a tubular adsorbent containing unit.
Figure 14:
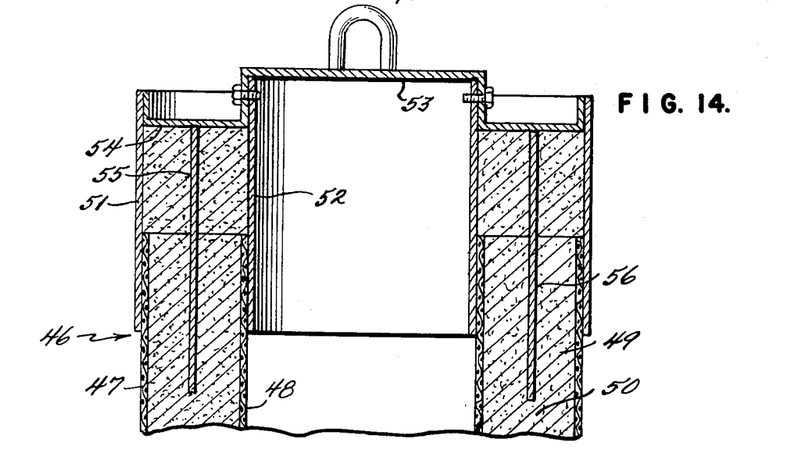
Fig. 14 is a vertical sectional view, with parts broken away, taken on the line 14—14 of Fig. 13.

The adsorbent containers 46 are identical in construction and, as best shown in Figs. 13 and 14, each comprises two concentric tubular wire screens 47, 48, held in spaced relation by a plurality of longitudinal radial fins 49, with the annular space between the screens closed at the bottom. The mesh of the screens is such as to retain a granular adsorbent material 50 in the annular space between the screens. The adsorbent employed may be any adsorbent having characteristics substantially like silica gel or the gel of other activated hydrous oxide. Preferably, silica gel is used.

Each of the containers 46 is closed at its top by means of concentric hoops 51, 52 mounted on the concentric screens 47, 48, and a cover plate 53 detachably connected to the inner hoop 52, as by screw bolts, and having a depending annular flange 54 fitting between the hoops 51, 52. A depending annular fin 55 is secured to the flange 54 and projects downwardly between and below the hoops 51, 52, and fits in slots 56 formed in the upper ends of the radial fins 49, all as shown in Fig. 14. The construction being such that, as the silica gel settles down, leaving a space between the top portion of the wire screens devoid of silica gel, the fin 55 will prevent gas or vapor from passing through the space devoid of silica gel. Each container is detachably mounted on a nozzle 57 projecting upwardly from an opening 58 formed in the plate 45, as clearly shown in Fig. 6. The nozzle 57 is secured in the opening 58, as by welding, to form a gas-tight joint.

The top and bottom manifolds 22, 23 are mounted on the top and bottom of the annular drum 24, in communication with the annular openings 39, 42 formed in the top and bottom of the drum. The manifolds are identical in construction and each is formed in the shape of an annular trough having an annular top (or bottom) 59 and annular side walls 60, 61 (see Fig. 8).

A plurality of compression springs 62, mounted on brackets 63 suitably secured to the inner walls of the vessel 21, yieldably press the top and bottom manifolds against the top and bottom, respectively, of the annular drum, as shown in Fig. 6. The top and bottom manifolds are held stationary relative to the rotation of the annular drum by means hereinafter to be described, and, to prevent the escape of gas between the rotating drum and the manifolds, sealing ring gaskets 64 are placed at the junction of the side walls of the manifold and the drum. The sealing ring gaskets 64 are held in tight sealing engagement with the top and bottom of the drum by means of annular hoops 65 which encircle the gaskets and hold them against the side walls of the manifold, as by welding. The ring gaskets are retained between the hoops 65 and the side walls 60, 61 of the manifolds by means of a plurality of circumferentially spaced threaded bolts 66, which engage the ring gaskets and the lower portions of the hoops and side walls. The ring gaskets 64 are yieldably held in engagement with the top and bottom of the drum 24 by means of a plurality of compressed springs 67 mounted on stud bolts 68 secured to the top (or bottom) of the manifolds and engaging annular plates or members 69 mounted on the top (or bottom) of the ring gaskets, all as clearly shown in Fig. 8.

Figure 8:
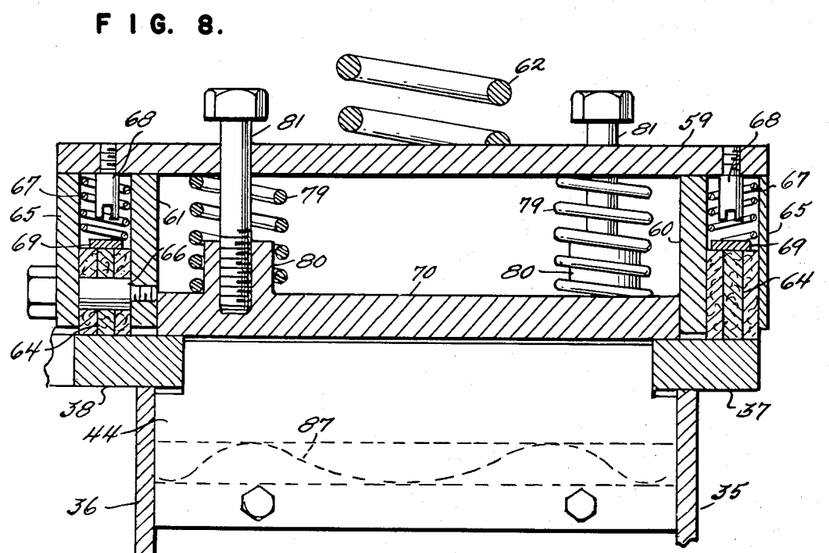
Fig. 8 is an enlarged vertical sectional view of the seal shown in the right hand side of the upper manifold of Fig. 6.
Figure 9:
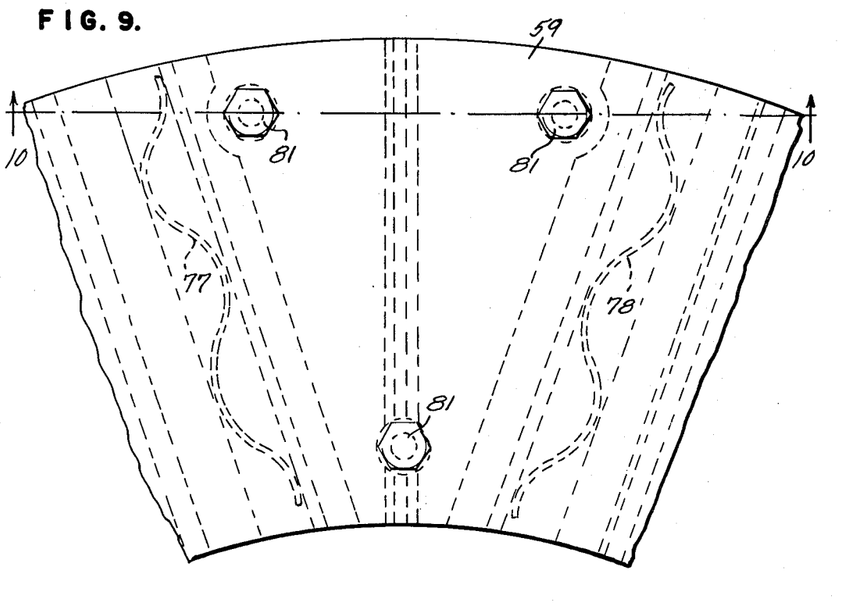
Fig. 9 is a plan view of the seal shown in Fig. 8.
Figure 10:
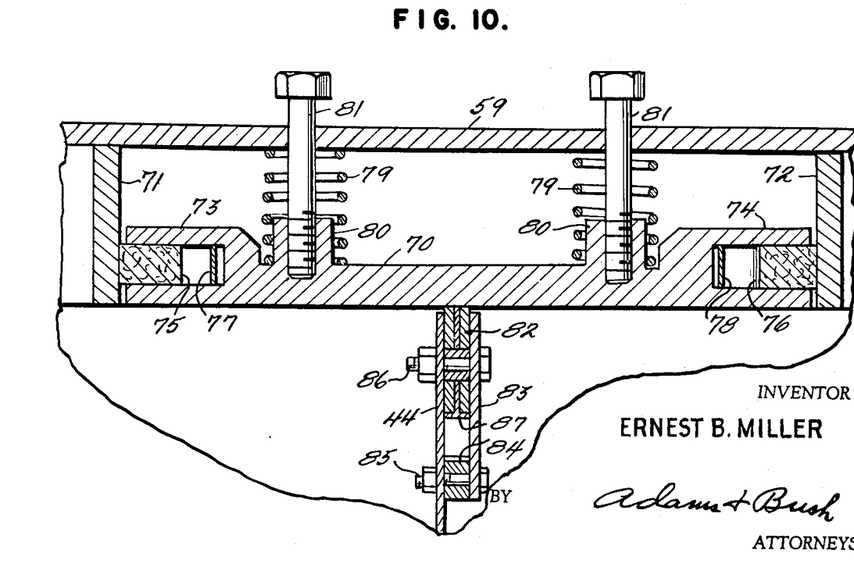
Fig. 10 is a vertical sectional view, taken on the line 10—10 of Fig. 9.

At four circumferentially spaced points in the top and bottom manifolds, there are located seals which, by reason of the sliding contact of the radial partitions 44 against the under surface of the bottoms of the seals, divide the manifolds and drums into four sectors, each sector gas-tight with respect to the adjacent sectors. The seals are identical in construction and the details thereof are best shown in Figs. 8, 9 and 10. Each seal includes a bottom or sealing plate 70 mounted within the manifold between spaced radial partition walls 71, 72. The bottom plate 70 is yieldably urged against the top (or bottom) of the drum and rests on the concentric annular plates 37, 38 which form the top of the drum (or plates 40, 41 which form the bottom of the drum), as shown in Fig. 8. The side edges of the plate 70 are bifurcated, as shown at 73, 74, for the reception of gasket strips 75, 76, which are yieldably pressed outwardly against the partition walls 71, 72 of the seal by leaf springs 77, 78, as shown in Figs. 9 and 10.

The means for yieldably pressing the bottom plate 70 of the seal against the top (or bottom) of the drum comprises a plurality of compression springs 79 mounted on projections 80, formed on the upper surface of the plate 70. The springs 79 engage the top (or bottom) of the seal and are held in position by bolts 81 projecting through the top (or bottom) of the seal and the coiled springs and threaded into the projection 80 formed on the plate 70.

Each radial partition or diaphragm 44 has a portion of its top and bottom edges extending upwardly (or downwardly) between the edges of the openings in the top and bottom of the drum. A gasket 82 is secured on these portions and extends above (or below) their top (or bottom) edges and engages the under face of the bottom plate 70 of the seal.

Plates 83 are secured to the tops and bottoms of the portions and are held spaced therefrom by a spacer strip 84, the plates and spacer strip being secured to the partitions by bolts 85. The gaskets 82 are confined between the partitions and the plates 83, as by means of bolts 86, and are pressed upwardly (or downwardly) against the under surface of the bottom plates 70 of the seals by means of leaf springs 87, all as shown in Fig. 10.

Figure 11:
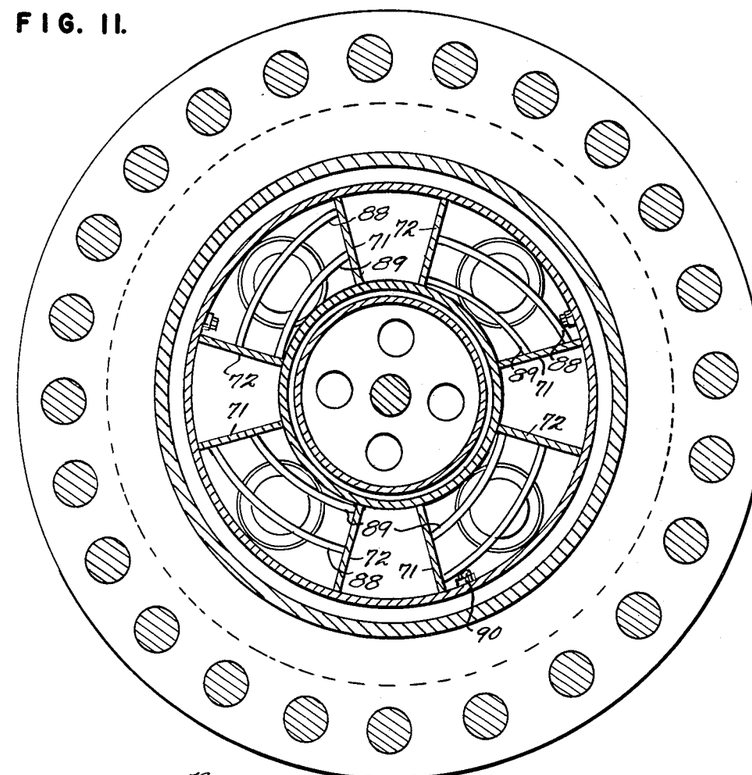
Fig. 11 is a horizontal sectional view, taken on the line 11—11 of Fig. 6.

In order to prevent the gaskets 82 from being unduly pressed upwardly (or downwardly) when the gaskets are not engaging the bottoms of the seals, means are provided for spanning the reaches of the manifolds between the seals. These means comprise spaced pairs of curved plates 88, 89 which extend between and are secured to the partition walls of the seal, as shown in Fig. 11. The bottom surfaces of the plates 88, 89 are in the same horizontal plane as the bottom surfaces of the bottom plates 70 of the seals, so that, as the gaskets 82 move out of engagement with the bottom plate of the seal, they immediately engage the plates 88, 89.

Figure 12:
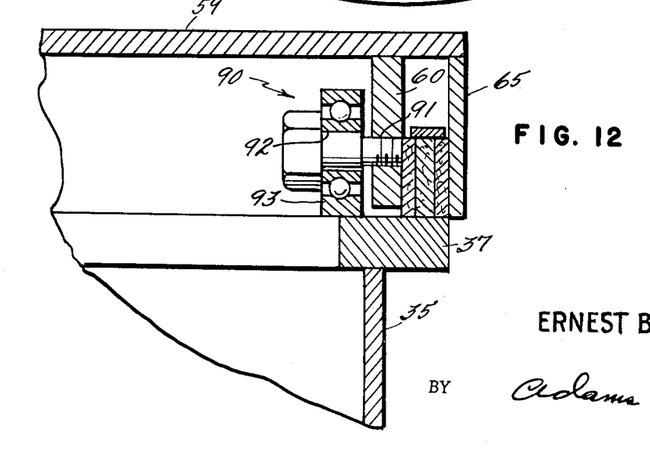
Fig. 12 is a partial vertical sectional view of a manifold, showing the details of a roller.

A plurality of rollers 90 are mounted within the top and bottom manifolds. These rollers are circumferentially spaced within the manifolds and are adapted to engage the annular plates 37, 40 which form parts of the top and bottom, respectively, of the rotatable drum. These rollers are adapted to prevent frictional surface engagement between the side walls of the manifolds and the top and bottom of the drum. These rollers are identical in construction and mounting and each comprises a threaded stud bolt 91 screwed into the outer side wall 60 of the manifold; a ball race 92 fixedly mounted on the bolt, and a wheel 93 mounted on the ball race, all as shown in Fig. 12.

Four pipes or conduits 94, 95, 96 and 97 having threaded ends project through the cap of the vessel 21 and have their threaded ends secured to the top plate of the top manifold by means of lock nuts 98, which form gas-tight joints. The pipes are welded to the cap and hold the top manifold stationary relative to the rotation of the drum. The four pipes are circumferentially spaced with respect to the top manifold and each is secured to and communicates with the manifold at a point located between the seals.

Four additional pipes 99, 100, 101, and 102, having threaded ends, project through the bottom of the vessel 21 and have their threaded ends secured to the bottom plate of the bottom manifold by means of lock nuts 103 which form gas-tight joints. These pipes are welded to the bottom of the vessel 21 and hold the bottom manifold stationary relative to the rotation of the drum. These pipes are circumferentially spaced with respect to the bottom manifold and each is secured to and communicates with the manifold at a point located between the seals. The width of the seals with respect to the radial compartments 43 containing the units is such that at all times at least one of the partitions or diaphragms 44 is engaging the bottom plate 70 of the seal in gas-tight engagement.

From the foregoing, it readily will be seen that by engagement of the radial partitions with the seals, the manifold and drum are divided into four gas-tight chambers or sectors, or zones which form the first and second dehydration stages, the activation stage, and the purging stage. The drum 24 carrying the tubular adsorbent containers is rotated counter-clockwise as viewed in Fig. 3, and, as it rotates, the tubular adsorbent containers are successively moved through the four sectors or stages in the following order: the activation stage, the purging stage, the second dehydration stage and the first dehydration stage. The four pipes 94, 95, 96 and 97 are connected to pipe lines 7, 9, 18 and 12, respectively; and the four pipes 99, 100, 101 and 102 are connected to pipe lines 8, 10, 17 and 11, respectively, by means of which the gas being treated, the activation gas, and the purging gas, flow into and through the dehydrater.

The flow of the wet gas being treated through the first and second dehydration stages, the flow of the purging medium through the purging stage, and the flow of the activation gas through the activation stage are shown schematically in Fig. 1.

The wet gas from which moisture and hydrocarbons are to be removed is supplied under high pressure by pipe line 7 and enters the top manifold of the first dehydration stage through pipe 94. Then, it moves downwardly from the manifold through the opening in the top of the drum into the various compartments of the drum, containing the adsorber units, as are at that time contained within the sector forming the first stage. The gas passes through the pervious layer of absorbent material, which removes part of the moisture content therefrom, into the hollow interior of the adsorber units, thence downwardly through the openings in the plates 45 into the bottom of the drum and through the opening therein into the bottom manifold. From the bottom manifold, the now partially dried gas passes through pipes 99 and 8 to the intercooler 2, where it is cooled. The intercooler 2 may be of the water circulating type. From the intercooler, the gas moves through pipes 9 and 95 into the top manifold of the second dehydration stage. The gas moves downwardly through the second stage, in a manner similar to its downward movement through the first stage, into the bottom manifold of the second stage, the remainder of the moisture content of the gas being removed during its passage through the second stage.

From the bottom manifold of the second stage, the now dried gas moves through pipes 100 and 10 to the various points of use.

The removal of the moisture and hydrocarbons from the absorbent material carried by the annular dehydrater units is effected in the activation stage. The activation gas is heated in the heater 3, where its temperature is raised from 300° F. to 600° F., depending upon the moisture content and the type of hydrocarbons to be recovered. From the heater, the heater gas passes through pipe lines 11 and 102 into the bottom manifold of the activation stage. From the bottom manifold, the hot gases pass through the opening in the bottom of the drum into the bottom of the various compartments of the drum as are at that time contained within the sector forming the activation stage, thence upwardly through the openings in the plates 45 and up into the hollow interior of the annular adsorber units, through the pervious solid layer of adsorbent material into the compartments of the drum. As the hot gas passes through the adsorbent material it removes the moisture and hydrocarbons therefrom. The hot, moisture-hydrocarbon-laden gas then passes upwardly through the opening in the top of the drum into the top manifold. From the top manifold, the hot gas passes through pipe lines 97 and 12 to the condenser separator 5 where the moisture and condensable hydrocarbons are condensed and separated. The water and hydrocarbons are drained from the bottom of the separator by means of a drain line 13.

From the condenser separator the now stripped gas passes through a pipe line 14 to the fan or blower 4 and is recirculated by the blower through pipe line 15 and the heater 3 back through the activation stage. This recirculation process is continuous.

While any suitable gas may be used as the purging medium, preferably, and as shown, the gas used for purging is provided by diverting a portion of the effluent dry natural gas from the last dehydration stage of the dehydrater through pipe line 16, fan or blower 6 and pipe lines 17 and 101 into the bottom manifold of the purging stage. From the bottom manifold, the purging gas passes through the opening in the bottom of the drum into the bottom of the various compartments of the drum as are at that time contained within the sector forming the purging stage; thence, upwardly through the openings in the plate 45 and up into the hollow interior of the annular adsorber units, through the pervious solid layer of adsorbent material into the compartments of the drum. As the purging gas passes through the adsorbent material it removes all remaining activation gas and any remaining moisture and condensable hydrocarbons deposited thereon, thereby purging the material. The purging gas then passes upwardly through the opening in the top of the drum into the top manifold. From the top manifold, the purging gas passes through pipe lines 96 and 18 back into the flow of the wet gas being treated on the way to the first dehydration stage.

The chief purpose in mounting the annular drum and manifolds within the pressure vessel is to permit the equalization of pressure within the drum, manifolds and vessel, thereby permitting the drum and manifolds to be made of lighter weight material, which adds considerably to the efficient and economic operation of the dehydrater. This equalization of pressure is accomplished by means of a small opening formed in that portion of the pipe line 94 within the vessel 21. And, too, due to the unequal temperature of the gas as it passes through the various sectors, thereby resulting in unequal expansion of the parts of the drum and manifolds, it is considered desirable to provide each of the eight pipes 94, 95, 96, 97, 99, 100, 101 and 102, with expansion joints 104, located a short distance from their points of connection to the manifolds.

While the blower 4 has been described as a low pressure blower, it actually has to stand the full pressure of the system, and is low pressure only in the sense that it does not have to overcome much resistance in order to recirculate gases through the heater and activation stage of the dehydrater.

While the gas used for initially activating the adsorbent has been shown as being obtained from the supply line 7, obviously, a different source could be used, as well as a different kind of gas, such as air or steam.

Obviously, the invention is not restricted to the particular embodiment thereof herein shown and described. Moreover, it is not indispensable that all of the features of the invention be used conjointly, since they may be employed advantageously in various combinations and subcombinations.

What is claimed is:

1. In the removal of water vapor and condensable hydrocarbons from wet natural gas involving the contact of adsorbent material with the gas with resultant adsorption of the water vapor and condensable hydrocarbons by the adsorbent material and the subsequent treatment of the adsorbent material with a heated medium to vaporize and remove the water and condensable hydrocarbons and thereby reactivate the adsorbent material for further contact with the natural gases, the improvement which comprises rotating a series of separated thin beds of adsorbent material directly in succession and substantially continuously relative to and through a dehydration zone and a reactivation zone; continuously directing a flow of the gas to be treated through said dehydration zone; heating and recycling a flow of captive gas through said reactivating zone and a condensing and separating zone to gradually increase the vapor content of the captive gas stream until the dew point of said stream has been elevated to the temperature of said condensing and separating zone; continuously heating and recycling said captive gas stream after its dew point reaches the temperature of said condensing and separating zone, whereby the condensable vapor desorbed in the reactivation zone will be yielded as liquid in the condensing and separating zone; and continuously withdrawing the condensed liquid from the condensing and separating zone.

2. In the removal of water vapor and condensable hydrocarbons from wet natural gas involving the contact of adsorbent material with the gas with resultant adsorption of the water vapor and condensable hydrocarbons by the adsorbent material and the subsequent treatment of the adsorbent material with a heated medium to vaporize and remove the water and condensable hydrocarbons and thereby reactivate the adsorbent material for further contact with the natural gases, the improvement which comprises maintaining a bed of adsorbent material in each of two zones, directing a continuous flow of wet natural gas through one of said zones so that the water vapor and condensable hydrocarbons in the gas will be adsorbed by the beds of adsorbent material therein; heating and recycling a flow of captive gas through the other of said zones and a condensing and separating zone to gradually increase the vapor content of the captive gas stream until the dew point of said stream has been elevated to the temperature of said condensing and separating zone by vaporizing water and condensable hydrocarbons contained in the adsorbent material in said other of said zones and continuously heating and recycling said captive gas stream after its dew point reaches the temperature of said condensing and separating zone, whereby the condensable vapors desorbed in said other of said zones will be yielded as liquid in the condensing and separating zone; continuously withdrawing the condensed liquid from the condensing and separating zone; and periodically shifting the relative position of the particular adsorbent bed and the particular flow of fluid in each of said zones so that each zone becomes, in succession, a dehydration zone and a reactivating zone.

3. In the removal of water vapor and condensable hydrocarbons from wet natural gas involving the contact of adsorbent material with the gas with resultant adsorption of the water vapor and condensable hydrocarbons by the adsorbent material and the subsequent treatment of the adsorbent material with a heated medium to vaporize and remove the water and condensable hydrocarbons and thereby reactivate the adsorbent material for further contact with the natural gas, the improvement which comprises maintaining at least one bed of adsorbent material in each of a plurality of zones; heating and recycling a flow of captive gas through at least one of said zones and a condensing and separating zone to gradually increase the vapor content of the captive gas stream until the dew point of said stream has been elevated to the temperature of said condensing and separating zone by vaporizing water and condensable hydrocarbons contained in the adsorbent material in said one of said zones and continuously heating and recycling said captive gas stream after its dew point reaches the temperature of said condensing and separating zone, whereby the condensable vapors desorbed in said one of said zones will be yielded as liquid in the condensing and separating zone; continuously withdrawing the condensed liquid from the condensing and separating zone; continuously directing the flow of a purging medium through at least another one of said zones to purge the adsorbent material therein by removing all of the remaining activation gas, moisture and condensable hydrocarbons therefrom; directing a continuous flow of the raw natural gas so that it will make a first passage through at least an additional one of said zones and a second passage through the remainder of the zones so that the water vapor and condensable hydrocarbons content of the gas will be adsorbed by the adsorbent material therein; periodically shifting the relative positions of the particular adsorbent material and the particular flow of fluid in each of said zones so that each zone becomes, in succession, a reactivation zone, a purging zone, and a dehydration zone.

4. The method as set forth in claim 3, wherein a portion of the flow of the effluent natural gas from the last dehydration zone is continuously diverted for use as the purging medium and wherein the flow of the purging medium after its passage through the purging zone is continuously directed back into the flow of the natural gas on its way to a dehydration zone.

5. In the removal of water vapor and condensable hydrocarbons from wet natural gases involving the contact of adsorbent material with the gas with resultant adsorption of the water and condensable hydrocarbons by the adsorbent material and the subsequent treatment of the adsorbent material with a heated medium to vaporize and remove the water and condensable hydrocarbons and thereby reactivate the adsorbent material for further contact with natural gases, the improvement which comprises rotating a series of separated thin beds of adsorbent material directly in succession and substantially continuously relative to and through a succession of dehydrating zones and a reactivating zone; continuously directing a flow of the gas to be treated in succession and in series through said dehydrating zones; continuously withdrawing the dehydrated gas from the last one of the dehydrating zones; heating and recycling a flow of hot captive gas through said reactivating zone and a condensing and separating zone to gradually increase the vapor content of the captive gas stream until the dew point of said stream has been elevated to the temperature of said condensing and separating zone; continuously heating and recycling said captive gas stream after its dew point reaches the temperature of said condensing and separating zone, whereby the condensable vapor desorbed in the reactivation zone will be yielded as liquid in the condensing and separating zone; and continuously withdrawing the condensed liquid from the condensing and separating zone.

6. In the removal of water vapor and condensable hydrocarbons from wet natural gas involving the contact of adsorbent material with the gas with resultant adsorption of the water vapor and condensable hydrocarbons by the adsorbent material and the subsequent treatment of the adsorbent material with a heated medium to vaporize and remove the water and condensable hydrocarbons and thereby reactivate the adsorbent material for further contact with the natural gas, the improvement which comprises maintaining at least one bed of adsorbent material in each of a plurality of zones; heating and recycling a flow of captive gas through one of said zones and a condensing and separating zone to gradually increase the vapor content of the captive gas stream until the dew point of said stream has been elevated to the temperature of said condensing and separating zone by vaporizing water and condensable hydrocarbons contained in the adsorbent material in said one of said zones and continuously heating and recycling said captive gas stream after its dew point reaches the temperature of said condensing and separating zone, whereby the condensable vapors desorbed in said one of said zones will be yielded as liquid in the condensing and separating zone; continuously withdrawing the condensed liquid from the condensing and separating zone; directing a continuous flow of wet natural gas in succession and in series through the remainder of said zones so that the water vapor and condensable hydrocarbons in the gas will be adsorbed by the beds of adsorbent material therein; periodically shifting the relative position of the particular adsorbent beds and the particular flow of fluid in each of said zones so that each zone will become, in succession, a reactivation zone, and, in reverse order to the flow of gas therethrough, each a successive dehydration zone, whereby the gas being dehydrated will make its last passage through freshly reactivated adsorbent material beds.

7. In the removal of water vapor and condensable hydrocarbons from wet natural gas involving the contact of adsorbent material with the gas with resultant adsorption of the water vapor and condensable hydrocarbons by the adsorbent material and the subsequent treatment of the adsorbent material with a heated medium to vaporize and remove the water and condensable hydrocarbons and thereby reactivate the adsorbent material for further contact with the natural gas, the improvement which comprises maintaining at least one bed of adsorbent material in each of a plurality of zones; heating and recycling a flow of captive gas through at least one of said zones and a condensing and separating zone to gradually increase the vapor content of the captive gas stream until the dew point of said stream has been elevated to the temperature of said condensing and separating zone by vaporizing water and condensable hydrocarbons contained in the adsorbent material in said one of said zones and continuously heating and recycling said captive gas stream after its dew point reaches the temperature of said condensing and separating zone, whereby the condensable vapors desorbed in said one of said zones will be yielded as liquid in the condensing and separating zone; continuously withdrawing the condensed liquid from the condensing and separating zone; continuously directing the flow of a purging medium through at least another one of said zones to purge the adsorbent material therein by removing all of the remaining activation gas, moisture and condensable hydrocarbons therefrom; directing a continuous flow of the raw natural gas through the remainder of the zones so that the water vapor and condensable hydrocarbons content of the gas will be adsorbed by the adsorbent material therein; periodically shifting the relative positions of the particular adsorbent material and the particular flow of fluid in each of said zones so that each zone becomes, in succession, a reactivation zone, a purging zone, and a dehydration zone.

8. The method as set forth in claim 7, wherein a portion of the flow of the effluent natural gas from the last dehydration zone is continuously diverted for use as the purging medium and wherein the flow of the purging medium after its passage through the purging zone is continuously directed back into the flow of the natural gas on its way to a dehydration zone.

(References on following page)

References Cited in the file of this patent

UNITED STATES PATENTS

| | | |
|---|---|---|
| 1,721,033 | Okochi | July 16, 1929 |
| 1,872,783 | Miller | Aug. 23, 1932 |
| 1,998,774 | Bulkeley | Apr. 23, 1935 |
| 2,053,159 | Miller | Sept. 1, 1936 |
| 2,083,732 | Moore et al. | June 15, 1937 |
| 2,507,538 | Miller | May 16, 1950 |
| 2,535,902 | Dailey, Jr. | Dec. 26, 1950 |
| 2,630,191 | Miller | Mar. 3, 1953 |